United States Patent Office 3,297,718
Patented Jan. 10, 1967

3,297,718
OXIDE DERIVATIVES OF 3-ARYLOXYTHIETANES
Manfred Sander, Frankfurt am Main, Germany, assignor, by mesne assignments, to Mobil Oil Corporation, a corporation of New York
No Drawing. Filed Oct. 21, 1963, Ser. No. 317,803
7 Claims. (Cl. 260—327)

The invention relates to novel oxide derivatives of aryloxythietanes and, in particular, to aryloxythietane-1-oxides of the following structure:

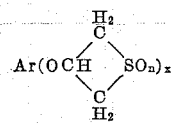

wherein Ar is an aromatic group, $n$ is an integer of 1 and 2, and $x$ is an integer of 1, 2 and 3. Specific embodiments include compounds of the following structure:

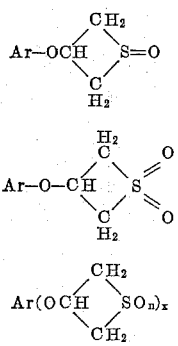

wherein $x$ is 2, and the like. In further embodiments, Ar is a member from the group consisting of an aromatic hydrocarbon radical and aromatic hydrocarbon groups ring-substituted with, for example, alkyl, alkoxy, halogen, nitro, acylamino, hydroxy, dialkylamino, or acyloxy groups.

The novel compounds embodied herein can be prepared by oxidation of the corresponding aryloxythietanes with oxidants such as chromic acid, permanganate, persulfate. Preferably oxidation is effected with hydrogen peroxide under mild conditions which alternatively leads to the monoxide or the dioxide depending on the quantity of oxidant used. For example, treatment of 1 mole of an aryloxythietane with 1 mole of hydrogen peroxide at room temperature or slightly elevated temperature gives the corresponding aryloxythietane oxide whereas treatment with 2 or more moles of hydrogen peroxide results in the corresponding aryloxythietane dioxide. The rate of reaction can be increased by heating without occurrence of side reactions. Analogously, the dioxides can also be prepared by oxidation of the monoxides. The hydrogen peroxide is preferably used in aqueous solution. Since aryloxythietanes are generally insoluble in water, it is preferable to add a solvent miscible with water in order to obtain a homogeneous reaction solution. The preferred solvent is acetic acid, which also has an accelerating action on the oxidation. The reaction products may be isolated simply by precipitation with water.

The synthesis of aryloxythietane oxides or aryloxythietane dioxides substituted in the aromatic radical can either start from the corresponding aryloxythietane or involve subsequent substitution, for example, by nitration, halogenation or sulfonation of the aryloxythietane oxides or aryloxythietane dioxides.

The synthesis of unsubstituted and substituted aryloxythietane oxides and aryloxythietane dioxides from the corresponding aryloxythietanes is described hereinafter with aryloxythietanes prepared by the method disclosed in copending application, Serial Number 263,116, filed March 6, 1963, entitled "Novel Thietanes and Their Preparation," now matured to U.S. 3,256,298, by interaction of the corresponding phenols with chloropropene sulfide. For preparation of aryloxythietanes, there can be used monophenols as well as polyhydroxybenzenes and, in which, in the case of the latter, novel compounds as embodied herein can be prepared in which $x$ in the foregoing structural formulas is an integer of more than 1.

The following examples are presented for the purpose of illustrating the invention without the intent of limitation:

EXAMPLE 1

3-phenoxythietane-1-oxide

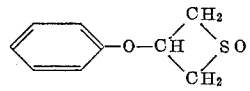

30 grams of 3-phenoxythietane was dissolved in 100 ml. glacial acetic acid. To this solution, 21 ml. of 30 percent aqueous hydrogen peroxide solution was added dropwise in such a manner that the temperature did not rise above 25° C. The resultant solution was stirred at room temperature for 1 hour and then treated with 500 ml. of water. After storing overnight the solution was filtered and the precipitate recrystallized from hot ethanol. Yield 15 g. (M.P. 90–95° C.) containing 17.7 percent of sulfur (calculated for $C_9H_{10}OS$: 17.6 percent).

EXAMPLE 2

3-phenoxythietane-1-dioxide

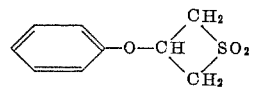

To 20 grams of 3-phenoxythietane dissolved in 300 ml. of ethanol 41 ml. of 30 percent aqueous hydrogen peroxide solution was added. After 3 hours' storage at room temperature, the ethanol was distilled off and the crystalline residue recrystallized from 250 ml. of ethanol. Yield 17.5 g. (M.P. 147° C.) containing 16.3 percent of sulfur (calculated for $C_9H_{10}O_2S$: 16.2 percent).

EXAMPLE 3

3-(4-nitrophenoxy)thietane-1-oxide

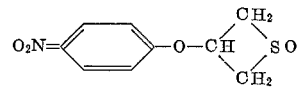

30 grams of 3-(4-nitrophenoxy)thietane was dissolved in 200 ml. of glacial acetic acid and treated with 16.5 ml. of 30 percent aqueous hydrogen peroxide solution. After storage for 3 hours at room temperature, 750 ml. of water was added, the crude product precipitating. Recrystallization from alcohol gave 16.5 g. of product (M.P. 116–118° C.) containing 14.3 percent of sulfur (calculated for $C_9H_9O_4NS$: 14.1 percent).

EXAMPLE 4

3-(4-nitrophenoxy)thietane-1-dioxide

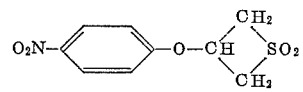

24 grams of 3-(4-nitrophenoxy)thietane was dissolved in 250 ml. of glacial acetic acid; the solution was treated with 38.7 ml. of 30 percent hydrogen peroxide solution and refluxed for 1 hour. On cooling the product precipitated in crystalline form and was recrystallized twice from ethanol. Yield 14 g. (M.P. 154° C.) containing 13.1 percent of sulfur (calculated for $C_9H_9O_5NS$: 13.2 percent).

EXAMPLE 5

*3-(4-chlorophenoxy)thietane-1-dioxide*

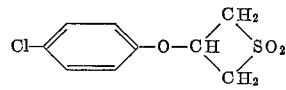

A solution of 20 grams of 3-(4-chlorophenoxy)thietane in 300 ml. of ethanol was treated with 34 ml. of 30 percent aqueous $H_2O_2$ and refluxed for 3 hours. The alcohol was distilled off and the solid residue recrystallized from ethanol. Yield 17 g. (M.P. 190° C.) containing 13.7 percent of sulfur (calculated for $C_9H_9O_2SCl$: 13.8 percent).

EXAMPLE 6

*3-(2,4-dichlorophenoxy)thietane-1-oxide*

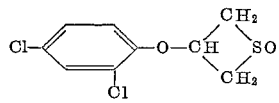

To a solution of 20 grams of 3-(2,4-dichlorophenoxy)thietane in 100 ml. of glacial acetic acid, 9.7 ml. of 30 percent aqueous hydrogen peroxide solution was added dropwise in such a manner that the temperature did not rise above 30° C. The solution was stirred for 1 hour at room temperature and treated with 250 ml. of water. The precipitate was filtered off and recrystallized from ethanol. Yield 12 g. (M.P. 128° C.).

Analysis ($C_9H_8O_2SCl_2$) calc.: 12.8% S, 28.3% Cl, 43.1% C, 3.2% H. Found: 12.9% S, 28.4% Cl, 43.2% C, 3.2% H.

EXAMPLE 7

*3-(2,4-dichlorophenoxy)thietane-1-dioxide*

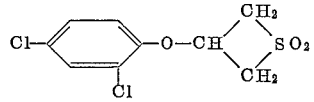

28.9 ml. of 30 percent aqueous $H_2O_2$ was added to a solution of 20 g. of 3-(2,4-dichlorophenoxy)thietane in 200 ml. of ethanol and the reaction solution was refluxed for 3 hours. The ethanol was distilled off and the solid residue recrystallized from ethanol. Yield 17 g. (M.P. 134° C.) containing 12.3 percent of sulfur (calculated for $C_9H_8O_3SCl_2$: 12.0 percent).

The novel compounds embodied herein are crystalline substances useful as herbicides, fungicides, insecticides and acaricides, as anti-oxidants and stabilizers for plastics, and as dye intermediates. Thus, and in example, 3-phenoxythietane dioxide possesses effectiveness as a house fly contact toxicant; 3-(4-chlorophenoxy)thietane dioxide as a systematic control of leaf rust of wheat; 3-(2,4-dichlorophenoxy)thietane dioxide as an acaricide (mites); 3-(4-nitrophenoxy)thietane dioxide as a systemic for control of leaf rust; 3-phenoxythietane oxide as a post emergence herbicide for weeds; and 4-(nitrophenoxy)thietane oxide as an acaricide.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A compound of the following formula:

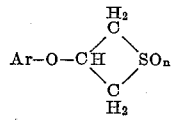

wherein, when $n$ is 1, Ar is a phenyl radical containing from 0 to 2 substituents selected from the group consisting of a hydroxy group, a nitro group, and a halogen; and when $n$ is 2, Ar is a phenyl radical containing from 1 to 2 substituents selected from the group consisting of a hydroxy group, a nitro group, and a halogen.

2. 3-phenoxythiethane-1-oxide.
3. 3-(4-nitrophenoxy)thietane-1-oxide.
4. 3-(2,4-dichlorophenoxy)thietane-1-oxide.
5. 3-(4-nitrophenoxy)thietane-1-dioxide.
6. 3-(4-chlorophenoxy)thietane-1-dioxide.
7. 3-(2,4-dichlorophenoxy)thietane-1-dioxide.

References Cited by the Examiner

Dittmer et al.: Jour.-Amer. Chem. Soc., Equiv. Digest, vol. 84, Feb. 5, 1962, page 401.

Lowy et al.: An Intro. to Org. Chem., John Wiley & Sons, New York (1945), page 213.

WALTER A. MODANCE, *Primary Examiner.*

J. A. PATTEN, *Assistant Examiner.*